(12) United States Patent
Kawarai et al.

(10) Patent No.: US 8,753,516 B2
(45) Date of Patent: Jun. 17, 2014

(54) CORROSION PREVENTING APPARATUS, CORROSION PREVENTING METHOD, AND WIRE ELECTRIC DISCHARGE MACHINING APPARATUS

(75) Inventors: Hisakatsu Kawarai, Tokyo (JP); Hironori Kuriki, Tokyo (JP); Jyunji Tanimura, Tokyo (JP); Tamayo Ohata, Tokyo (JP); Tatsushi Sato, Tokyo (JP); Takashi Yuzawa, Tokyo (JP)

(73) Assignees: Mitsubishi Electric Corporation, Tokyo (JP); Ryoden Koki Engineering Co., Ltd., Aichi (JP)

( * ) Notice: Subject to any disclaimer, the term of this patent is extended or adjusted under 35 U.S.C. 154(b) by 0 days.

(21) Appl. No.: 13/513,709

(22) PCT Filed: Dec. 4, 2009

(86) PCT No.: PCT/JP2009/006617
§ 371 (c)(1),
(2), (4) Date: Jun. 6, 2012

(87) PCT Pub. No.: WO2011/067818
PCT Pub. Date: Jun. 9, 2011

(65) Prior Publication Data
US 2012/0234797 A1 Sep. 20, 2012

(51) Int. Cl.
*B01D 15/04* (2006.01)
*C02F 1/42* (2006.01)
*B23H 7/04* (2006.01)

(52) U.S. Cl.
USPC .......................... 210/662; 210/663; 219/69.12

(58) Field of Classification Search
USPC .......... 210/662, 667, 676, 85, 96.1, 263, 143; 219/69.12, 69.1, 69.11, 69.14; 451/36, 451/60, 446
See application file for complete search history.

(56) References Cited

U.S. PATENT DOCUMENTS

| 5,985,152 | A | * | 11/1999 | Otaka et al. | 210/668 |
| 7,795,558 | B2 | * | 9/2010 | Nakajima et al. | 219/69.14 |
| 2007/0289925 | A1 | * | 12/2007 | Kawarai et al. | 210/681 |
| 2009/0057274 | A1 | | 3/2009 | Nakajima et al. | |

FOREIGN PATENT DOCUMENTS

| JP | 2002301624 A | 10/2002 |
| JP | 2009248247 A | 10/2009 |
| WO | 2006126248 A1 | 11/2006 |
| WO | 2007113906 A1 | 10/2007 |

OTHER PUBLICATIONS

International Search Report (PCT/ISA/210) issued on Mach 9, 2010 in the International Patent Application No. PCT/JP2009/006617.
Written Opinion (PCT/ISA/237) issued on Mach 9, 2010 in the International Patent Application No. PCT/JP2009/006617.

* cited by examiner

*Primary Examiner* — Nam Nguyen
*Assistant Examiner* — Claire Norris
(74) *Attorney, Agent, or Firm* — Sughrue Mion, PLLC; Richard Turner (57) ABSTRACT

A corrosion preventing apparatus including: a water purifying part that includes a hydrogen-ion form resin and a hydroxy-ion form resin; an anticorrosive part that includes a cation form resin and an anion form resin having anticorrosive ions supported thereon; a conductivity measuring part that measures a measured value of conductivity of a machining liquid; and a control part that controls a flow of the machining liquid to the water purifying part and the anticorrosive part on the basis of the conductivity measuring part; wherein the control part performs control on the basis of predetermined first and second conductivities and the measured value measured by the conductivity measuring part.

21 Claims, 8 Drawing Sheets

FIG. 2

| | CONDUCTIVITY | EXISTENCE/NON-EXISTENCE OF FLOW INTO RESIN | |
|---|---|---|---|
| | | ANTICORROSIVE RESIN | WATER PURIFYING RESIN |
| STEP 1 | FIRST REFERENCE CONDUCTIVITY TO SECOND REFERENCE CONDUCTIVITY | EXISTENCE | EXISTENCE |
| STEP 2 | SECOND REFERENCE CONDUCTIVITY TO THIRD REFERENCE CONDUCTIVITY | EXISTENCE | NON-EXISTENCE |
| STEP 3 | THIRD REFERENCE CONDUCTIVITY TO SECOND REFERENCE CONDUCTIVITY | EXISTENCE | EXISTENCE |

FIG. 3

|  | ANION FORM RESING OF ANTICORROSIVE RESIN | | |
| --- | --- | --- | --- |
|  | $NO_2^-$ FORM RESIN | $MoO_4^{2-}$ FORM RESIN | $WO_4^{2-}$ FORM RESIN |
| FIRST REFERENCE CONDUCTIVITY | 8μS/cm OR MORE | 30μS/cm OR MORE | 40μS/cm OR MORE |
| SECOND REFERENCE CONDUCTIVITY | 4μS/cm OR MORE | 15μS/cm OR MORE | 20μS/cm OR MORE |
| THIRD REFERENCE CONDUCTIVITY | 5μS/cm OR MORE | 16μS/cm OR MORE | 21μS/cm OR MORE |

CORROSION PREVENTING APPARATUS, CORROSION PREVENTING METHOD, AND WIRE ELECTRIC DISCHARGE MACHINING APPARATUS

TECHNICAL FIELD

The present invention relates to a liquid-quality adjusting apparatus in a wire electric discharge machining apparatus using water as a machining liquid, and to an apparatus and method for preventing corrosion of a metal material which is a work piece, particularly, an iron-based material.

BACKGROUND ART

In wire electric discharge machining apparatuses using water as a machining liquid, there are known wire electric discharge machining apparatuses in which iron-based materials such as die steel or tool steel corrode when the iron-based materials are machined.

In order to prevent corrosion of iron-based metals in water, it is useful to add a passivator to the water. Meanwhile, a machining liquid in a wire electric discharge machining apparatus needs to maintain a low conductivity (electric conductivity) of about 70 μS/cm or smaller. However, if a passivator is directly added to a machining liquid, it is very difficult to maintain a low conductivity, and thus it becomes difficult to perform stable discharge.

For this reason, Patent Literature 1 discloses a technology using an anion-exchange resin including a passivator supported thereon, as a method of adding a passivator in a state in which a low conductivity is maintained.

Specifically, as a resin composition that does not increase the conductivity of water, an anion-exchange resin, which includes nitrite ions ($NO_2^-$) serving as anticorrosive ions and one or more kinds of carbonate ions ($CO_3^{2-}$), hydrogen carbonate ions ($HCO_3^-$) and hydroxide ions ($OH^-$) bound thereto and serves as an anticorrosive resin, are used, and these anions are dissolved in water. Also, there is disclosed a technology for suppressing the water to a predetermined conductivity (about 10 μS/cm or less) by using that anticorrosive resin together with a water purifying resin composed of a hydrogen-ion ($H^+$) form resin and a hydroxide-ion ($OH^-$) form resin in a case of applying that anticorrosive resin to a metal cleaning and storing machine, and making a portion of the water flow into the water purifying resin if the conductivity of the water increases.

Patent Literature 2 discloses a technology for converting a machining liquid into an alkaline aqueous solution and suppressing corrosion of a metal material insusceptible to passivating, such as an ultra-hard material, by using an anticorrosive resin including anticorrosive ions supported thereon, and a water purifying resin composed of a $H^+$ form resin and a $OH^-$ form resin together, and switching whether to make the machining liquid flow into each of the anticorrosive resin and the water purifying resin, according to a conductivity value.

CITATION LIST

Patent Literature

Patent Literature 1: Japanese Patent Application Laid-Open No. 2002-301624
Patent Literature 2: International Publication No. WO 2006/126248

SUMMARY OF INVENTION

Technical Problem

In Patent Literature 1, $NO_2^-$ is dissolved in water. However, since impurity ions, for example, cations such as $Na^+$, $K^+$, and $Ca^{2+}$, and anions such as $Cl^-$, and $SO_4^{2-}$, exist together in the water, and particularly, in addition to $NO_2^-$, one or more kinds of carbonate ions, hydrogen carbonate ions, and hydroxide ions are also released into the water, at this conductivity of the water, even if it is desired to detect the concentration of $NO_2^-$ serving as the anticorrosive ions, it is difficult to detect the concentration of $NO_2^-$ in the water. Therefore, it is difficult to manage the machining liquid such that the machining liquid includes an appropriate concentration of anticorrosive ions.

In order to detect the concentration of $NO_2^-$, quantitative analysis based on an ion chromatograph or ion test paper for $NO_2^-$ is necessary.

Further, the existence of the impurity ions (such as $Cl^-$ and $SO_4^{2-}$) other than $NO_2^-$ may increase the conductivity of the water so as to make it difficult to perform stable discharge.

Although Patent Literature 2 discloses the technology for switching whether to make the machining liquid flow into each of the anticorrosive resin and the water purifying resin, according to the conductivity value, since it is difficult to efficiently remove an minute amount of impurity ions in water having an influence on corrosion of an iron-based material, particularly, chloride ions ($Cl^-$), sulfate ions ($SO_4^{2-}$), or the like, the corrosion preventing effect on an iron-based metal is small.

The present invention was made to solve the problems, and an object of the present invention is to provide a method and apparatus capable of monitoring a concentration of $NO_2^-$ with a simple method without using analysis or ion test paper, and preventing corrosion of an iron-based metal in a state where a low conductivity is maintained.

Another object of the present invention is to provide a method of controlling flow of water into each of an anticorrosive resin and a water purifying resin so as to efficiently remove impurity ions in the water and increase a concentration of anticorrosive ions for efficiently preventing corrosion of an iron-based metal in a state where a low conductivity is maintained.

Means for Solving the Problem

In order to solve the above-described problems, a corrosion preventing apparatus according to the present invention includes: a water purifying part that includes a hydrogen-ion form resin and a hydroxy-ion form resin; an anticorrosive part that includes a cation form resin and an anion form resin having anticorrosive ions supported thereon; a conductivity measuring part that measures a measured value of conductivity of a machining liquid; and a control part that controls a flow of the machining liquid to the water purifying part and the anticorrosive part on the basis of the conductivity measuring part; wherein, on the basis of predetermined first and second conductivities and the measured value measured by the conductivity measuring part, the control part performs control such that the machining liquid flows into the water purifying part and the anticorrosive part until the measured value of the machining liquid reaches the first conductivity, if the measured value reaches the first conductivity, the control part performs control such that the flow of the machining liquid into the water purifying part stops and the machining liquid flows into only the anticorrosive part, and if the measured value increases up to the second conductivity, the control part performs control such that the flow of the machining liquid into the water purifying part restarts and the machining liquid flows into the water purifying part and the anticorrosive part.

Advantageous Effects of Invention

According to the present invention, impurity ions remaining in water are exchanged with one kind of cations and one kind of anticorrosive anions, and thus the water is converted into a highly-pure single solution including the anticorrosive ions. Therefore, the conductivity of the water and the concentration of the anticorrosive anions have a proportional relation. As a result, it is possible to grasp the concentration of the anticorrosive anions from a value of a conductivity meter, and to maintain the lowest conductivity necessary for preventing corrosion of an iron-based metal.

Further, since a volume ratio of a cation form resin to an anticorrosive resin, that is, (Volume of Cation Form Resin)/(Volume of Anticorrosive Resin) is set to smaller than 0.5, the cation form resin first comes to the end. Therefore, it is possible to estimate the life of the anticorrosive anions.

Furthermore, in a method of controlling the flow of the water into each of a anticorrosive resin and a water purifying resin on the basis of two conductivities, the water flows into only the anticorrosive resin, or flows into both of the anticorrosive resin and the water purifying resin. Therefore, it is possible to increase the concentration of anticorrosive ions in a state where the water is maintained at a low conductivity.

DESCRIPTION OF EMBODIMENTS

First Embodiment

First, an inventional concept of the present embodiment will be described.

In the present embodiment, whether to make water serving as a machining liquid, flow into each of an anticorrosive resin serving as an anticorrosive part and a water purifying resin serving as a water purifying part is controlled on the basis of a detected conductivity, such that the water is converted into a highly-pure single solution including anticorrosive anions and thus the conductivity of the water becomes proportional to the concentration of anticorrosive anions. Therefore, it is possible to manage the machining liquid including anticorrosive ions with a simple method, without using analysis or ion test paper.

Specifically, the present embodiment uses an ion exchange resin composed of a water purifying resin and an anticorrosive resin including a cation form resin and an anion form resin together.

Here, any kinds of cations capable of forming nitrite, molybdate, or tungstate can be used as cations which are supported by the cation form resin. However, from the view point that the cations which are supported by the cation form resin should have high solubility in water and be capable of being easily quantitated in water by a measuring instrument, it is preferable to use any one kind of sodium ions ($Na^+$), potassium ions ($K^+$), and calcium ions ($Ca^{2+}$).

Further, as the measuring instrument for quantitating those cations, for example, a sodium ion ($Na^+$) meter (Model TiN-1100), potassium ion ($K^+$) meter (Model TiN-7003), or calcium ion ($Ca^{2+}$) meter (Model TiN-7001) made by TOKO KAGAKU KENKYU-JO Co. Ltd. may be used.

The above-mentioned cations have no influence on corrosion of an iron-based metal and are used to estimate the life of the anticorrosive anion form resin and to maintain the proportional relation between the conductivity of the water and the concentration of anticorrosive anions.

Meanwhile, any one kind of nitrite ions ($NO_2^-$), molybdate ions ($MoO_4^{2-}$), and tungstate ions ($WO_4^{2-}$) may be used as anions which are supported by the anion form resin.

All of these three kinds of anions can passivate an iron-based metal, such that a corrosion preventing effect is obtained. Among them, $NO_2^-$ is lower in price as compared to the other kinds of anions, and has a corrosion preventing effect even at a low concentration. Therefore, $NO_2^-$ is effective in preventing corrosion of an iron-based metal in a wire electric discharge machining apparatus using low-conductivity water as a machining liquid.

Further, the three kinds of anions react with an iron-based metal or a water-contact member of an electric discharge machining apparatus, and thus, their concentrations are reduced. Therefore, it is necessary to supply an amount required for preventing corrosion of an iron-based metal. In this case, anions required for preventing corrosion of an iron-based metal is supplied to the machining liquid by making the machining liquid flow into the anticorrosive resin.

A volume ratio of the cation form resin to the anticorrosive resin, that is, (Volume of Cation Form Resin)/(Volume of Anticorrosive Resin) needs to be set to be 0.05 or larger and smaller than 0.5, according to the kinds and mixed degrees of impurity cations and impurity anions in the machining liquid.

For example, in a case where $Na^+$ and $NO_2^-$ are used as the cation form resin and the anion form resin of the anticorrosive resin, respectively, if the machining water of the wire electric discharge machining apparatus flows into the anticorrosive resin, in the machining water, the impurity cations (such as $K^+$ and Ca2+) are substituted by $Na^+$, and the impurity anions (such as $Cl^-$ and $SO_4^{2-}$) are substituted by $NO_2^-$.

Therefore, like in electric discharge machining in an environment such as a clean room where there is little duct including salt content, in a case where impurity cations such as $K^+$ and $Ca^{2+}$ other than $Na^+$ are rarely dissolved into the machining water, since the $Na^+$ form resin of an anticorrosive resin is rarely consumed, it is preferable to set the volume ratio of the $Na^+$ form resin to the $NO_2^-$ form resin to 0.05 or a value around 0.05.

Further, since most of sources of the impurity ions such as $K^+$ and $Ca^{2+}$ is a residual in the machining liquid, and external sources of impurity ions such as $K^+$ and $Ca^{2+}$ are rarely dissolved into the machining liquid while the wire electric discharge machining apparatus is used, it is preferable to set the volume ratio of the $Na^+$ form resin to the $NO_2$ form resin to 0.05 or a value around 0.05.

Meanwhile, in an environment where air has not been conditioned, or the like, impurity cations such as $K^+$ and $Ca^{2+}$ other than $Na^+$ remain in the machining liquid, and further, external sources of impurity cations such as $K^+$ and $Ca^{2+}$ are dissolved into the machining liquid while the wire electric discharge machining apparatus is used. Meanwhile, since it is necessary to secure a concentration of $NO_2^-$ in the machining liquid required for preventing corrosion of an iron-based metal, it is preferable to set the volume ratio of the $Na^+$ form resin to the $NO_2^-$ form resin to around 0.5.

In the present embodiment, if the machining water is made flow into the anticorrosive resin, that is, the $Na^+$-form and $NO_2^-$-form resin, the machining water is converted into a $NaNO_2$ solution, and thus the conductivity of the machining water is proportional to the concentration of $NO_2^-$.

Further, since the cation form resin ($Na^+$ form resin) and the anion form resin ($NO_2^-$ form resin) of the anticorrosive resin are exchanged with the impurity cations and the impurity anions dissolved in the machining water, respectively, the cation form resin comes to the end, earlier than the anion form resin. Therefore, it is possible to estimate the life of the anion form resin ($NO_2^-$ form resin).

Although the case of using the $Na^+$ form resin and the $NO_2^-$ form resin as the cation form resin and the anion form resin of the anticorrosive resin, respectively, has been described above, the cation form resin may be a $K^+$ or $Ca^{2+}$ form resin and the anion form resin may be a $MoO_4^{2-}$ or $WO_4^{2-}$ form resin. Even in this case, similarly to the case of using the $Na^+$-form and $NO_2^-$-form resin, it is preferable to set the volume ratio of the cation form resin to the anticorrosive resin to 0.05 or larger and smaller than 0.5.

Even if the machining water is made flow into the anticorrosive resin, for example, the $Na^+$-form and $NO_2^-$-form resin, it is very difficult to completely remove the impurity ions.

In order to maintain the proportional relation between the conductivity of the machining water and the concentration of anticorrosive anions, it is necessary to remove the impurity ions from the machining water. For this reason, in the present embodiment, the anticorrosive resin and the water purifying resin are used together.

As the water purifying resin combined with the above-mentioned anticorrosive resin, for example, it is preferable to use a $H^+$-form and $OH^-$-form resin.

If the machining water comes into contact with air, ion components or carbon dioxide included in salt content in the air is dissolved into the machining water. For this or other reasons, the conductivity of the machining water may increase. In this case, the water purifying resin functions to reduce the increased conductivity of the machining water. If the machining water flows into the water purifying resin, the impurity cations and the impurity anions in the machining water are substituted by $H^+$ and $OH^-$, respectively. As a result, the machining water is purified.

Now, a method of converting the machining water into highly-pure machining water including anticorrosive anions by using the anticorrosive resin and the water purifying resin together in a state where the machining water is maintained at a low conductivity necessary for wire electric discharge machining will be described.

On the assumption that the $Na^+$-form and $NO_2^-$-form resin and the $H^+$-form and $OH^-$-form resin are used as the anticorrosive resin and the water purifying resin, respectively, a flow pattern of the machining water will be described with reference to FIG. 1.

Figure 1:
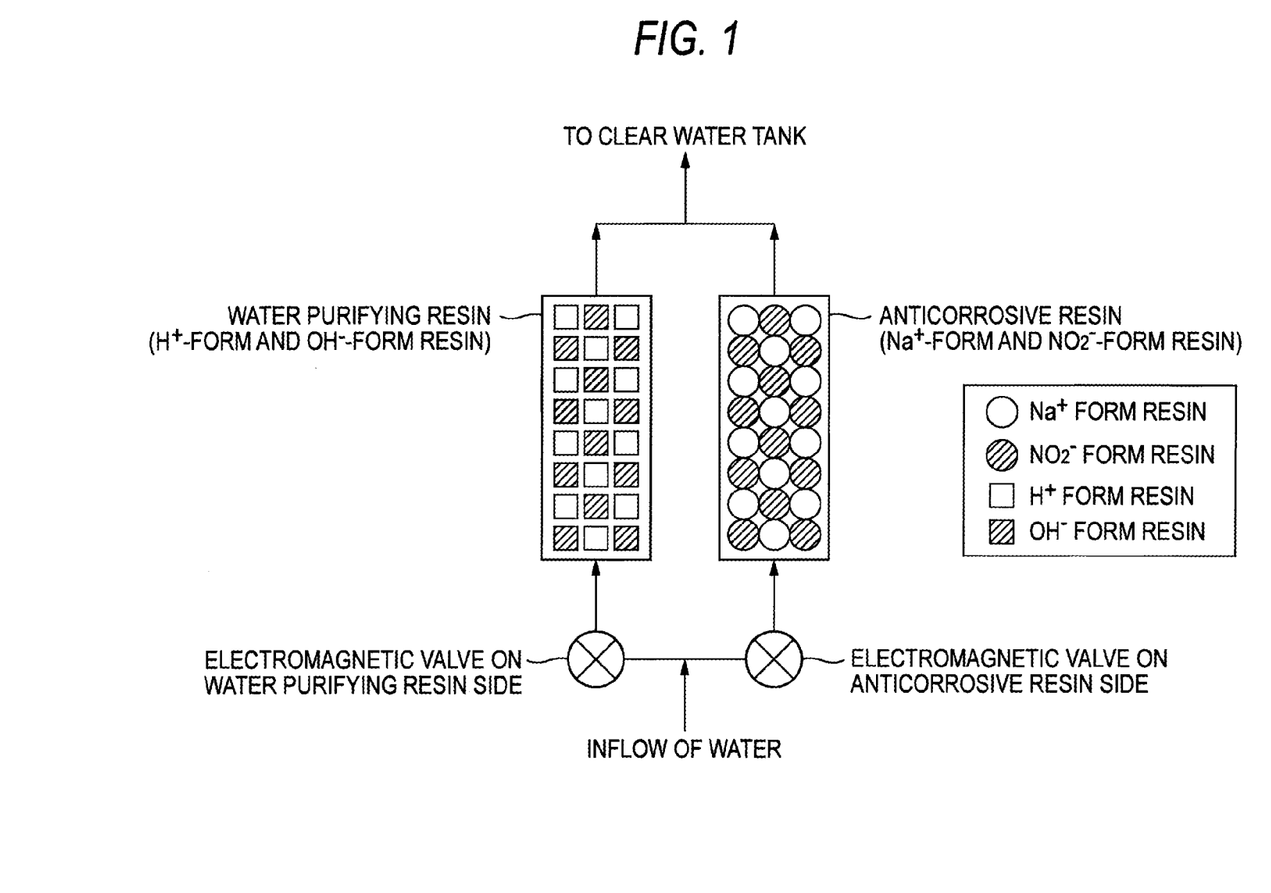
FIG. 1 is a conceptual view illustrating flows of water into an anticorrosive resin and a water purifying resin.

In FIG. 1, in an operation of pumping up water in a clear water tank for accumulating machining water by a pump, making the water into the anticorrosive resin and the water purifying resin, and returning the water back to the clear water tank, prior to making the water into the water purifying resin and the anticorrosive resin, switching operations of an electromagnetic valve on the anticorrosive resin side and an electromagnetic valve on the water purifying resin side are performed. In this way, whether to make the water flow into each of the anticorrosive resin and the water purifying resin is controlled in the flow pattern shown in FIG. 2.

Figure 2:
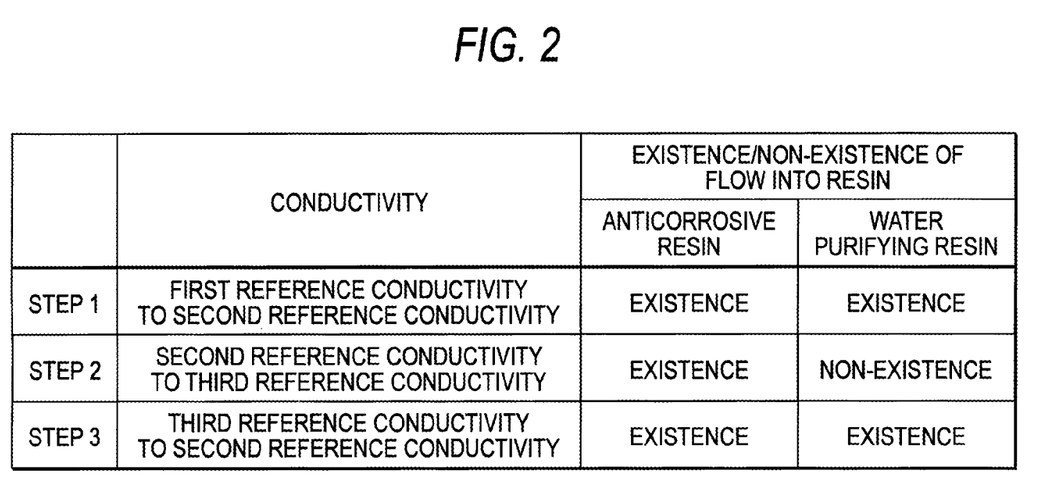
FIG. 2 is a pattern view illustrating a pattern in which the water flows into the anticorrosive resin and the water purifying resin.
Figure 3:
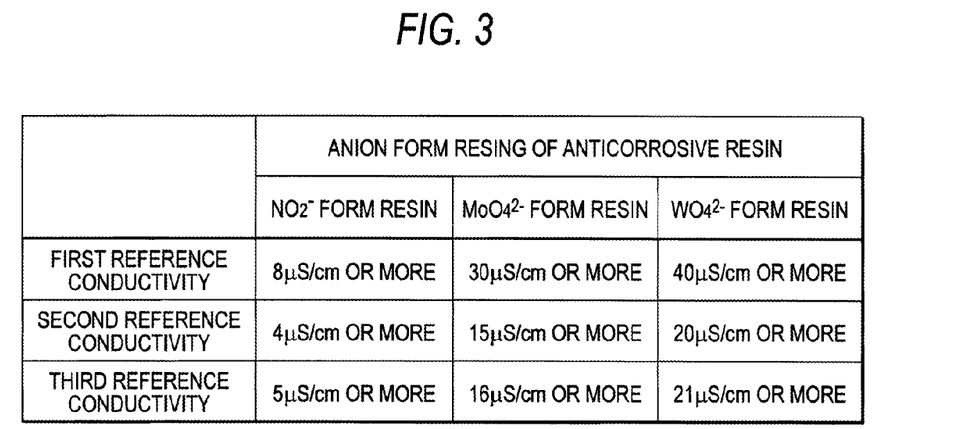
FIG. 3 is a view illustrating options for the kinds and conductivities of anion form resins in the anticorrosive resin.

The control shown in FIG. 2 is performed on the basis of the conductivity of the water measured by a conductivity measuring instrument provided in the clear water tank, and first to third reference conductivities are set equal to or larger than the conductivities shown in FIG. 3 according to the properties of anticorrosive resins. In the present embodiment, a case of using the $NO_2^-$ form resin will be described as an example. However, even if any of anticorrosive resins is used, the magnitudes of the first to third reference conductivities are in higher order from the first reference conductivity, the third reference conductivity, and the second reference conductivity.

First Step

If the electromagnetic valve on the anticorrosive resin side and the electromagnetic valve on the water purifying resin side in FIG. 1 are opened, the water in the clear water tank flows into both of the anticorrosive resin and the water purifying resin and thus the conductivity of the water in the clear water tank is reduced to a predetermined conductivity (the second reference conductivity) which is the lowest conductivity for obtaining the corrosion preventing effect on an iron-based metal.

This reduction of the conductivity is made by making the water flow into the water purifying resin. In the present embodiment, while the water is made flow into the water purifying resin, the water is made flow into the anticorrosive resin such that the impurity ions such as $K^+$ and $Cl^-$ are substituted by $Na^+$ and $NO_2^-$.

Also, the first reference conductivity and the second reference conductivity need to be set within ranges shown in FIG. 3, and the present inventors experimentally found out that before the water is made to flow into both of the water purifying resin and the $Na^+$-form and $NO_2^-$-form resin, only when the conductivity of the water in the clear water tank is 8 µS/cm or more, the corrosion preventing effect on an iron-based metal is obtained when the conductivity of the water in the clear water tank reaches the second conductivity.

Therefore, the first reference conductivity is set to a value of 8 µS/cm or larger.

Similarly, the present inventors found out that only when the conductivity of the water in the clear water tank is 4 µS/cm or more, after the water is made flow into both of the water purifying resin and the $Na^+$-form and $NO_2^-$-form resin, the corrosion preventing effect on an iron-based metal is obtained. Therefore, the first reference conductivity is set to a value of 4 µS/cm or larger.

Second Step

If the conductivity of the water in the clear water tank is reduced up to the second reference conductivity in the above-mentioned first step, the electromagnetic valve on the water purifying resin side is closed to stop the flow into the water purifying resin, and the water is made flow into only the anticorrosive resin.

Therefore, impurity cations and impurity anions intruded from the outside of the clear water tank or generated by dissolution of a water-contact member are substituted by $Na^+$ and $NO_2^-$, respectively. As a result, the conductivity of the water increases.

If the conductivity reaches a predetermined conductivity (the third reference conductivity), the next step (third step) is performed.

In order to remove the impurity ions remaining in the water in the clear water tank when the conductivity of the water reaches the second reference conductivity in the first step, and impurity ions newly generated (due to dissolution of carbon dioxide or ion components included in dust in the air, or the like) in the second step, the third reference conductivity needs to be set to a value larger than the second reference value by at least 1 µS/cm.

Therefore, the third reference conductivity is set to 5 µS/cm or larger.

Third Step

If the flow into the water purifying resin stops and the conductivity increases up to the third reference conductivity in the second step, the electromagnetic valve on the water purifying resin is opened, such that the flow of the water into the water purifying resin starts. Then, the water flows into both of the anticorrosive resin and the water purifying resin until the conductivity of the water in the clear water tank reaches the second reference conductivity described in the first step.

According to the above-mentioned first to third steps, some of the impurity ions remaining in the first step are substituted by $Na^+$ and $NO_2^-$, such that the water in the clear water tank is converted into a highly-pure $NaNO_2$ solution.

The above description has been made on the assumption that the $Na^+$-form and $NO_2^-$-form resin is used as the anticorrosive resin. However, even in a case of using a $K^+$-form and $NO_2^-$-form resin or a $Ca^{2+}$-form and $NO_2^-$-form resin, the first to third reference conductivities are set similarly to the case of using the $Na^+$-form and $NO_2^-$-form resin.

In a case of using a $MoO_4^{2-}$ form resin as the anion form resin, as the anticorrosive resin, a $Na^+$-form and $MoO_4^{2-}$-form resin, a $K^+$-form and $MoO_4^{2-}$-form resin, and a $Ca^{2+}$-form and $MoO_4^{2-}$-form resin can be exemplified. In a case of using any of those anticorrosive resins, the first reference conductivity is set to 30 µS/cm or larger, the second reference conductivity is set to 15 µS/cm or larger, and the third reference conductivity is set to 16 µS/cm or larger.

In a case of using a $WO_4^{2-}$ form resin as the anion form resin, as the anticorrosive resin, a $Na^+$-form and $WO_4^{2-}$-form resin, a $K^+$-form and $WO_4^{2-}$-form resin, and a $Ca^{2+}$ form and $WO_4^{2-}$-form resin can be exemplified. In a case of using any of those anticorrosive resins, the first reference conductivity is set to 40 µS/cm or larger, the second reference conductivity is set to 20 µS/cm or larger, and the third reference conductivity is set to 21 µS/cm or larger.

Figure 4:
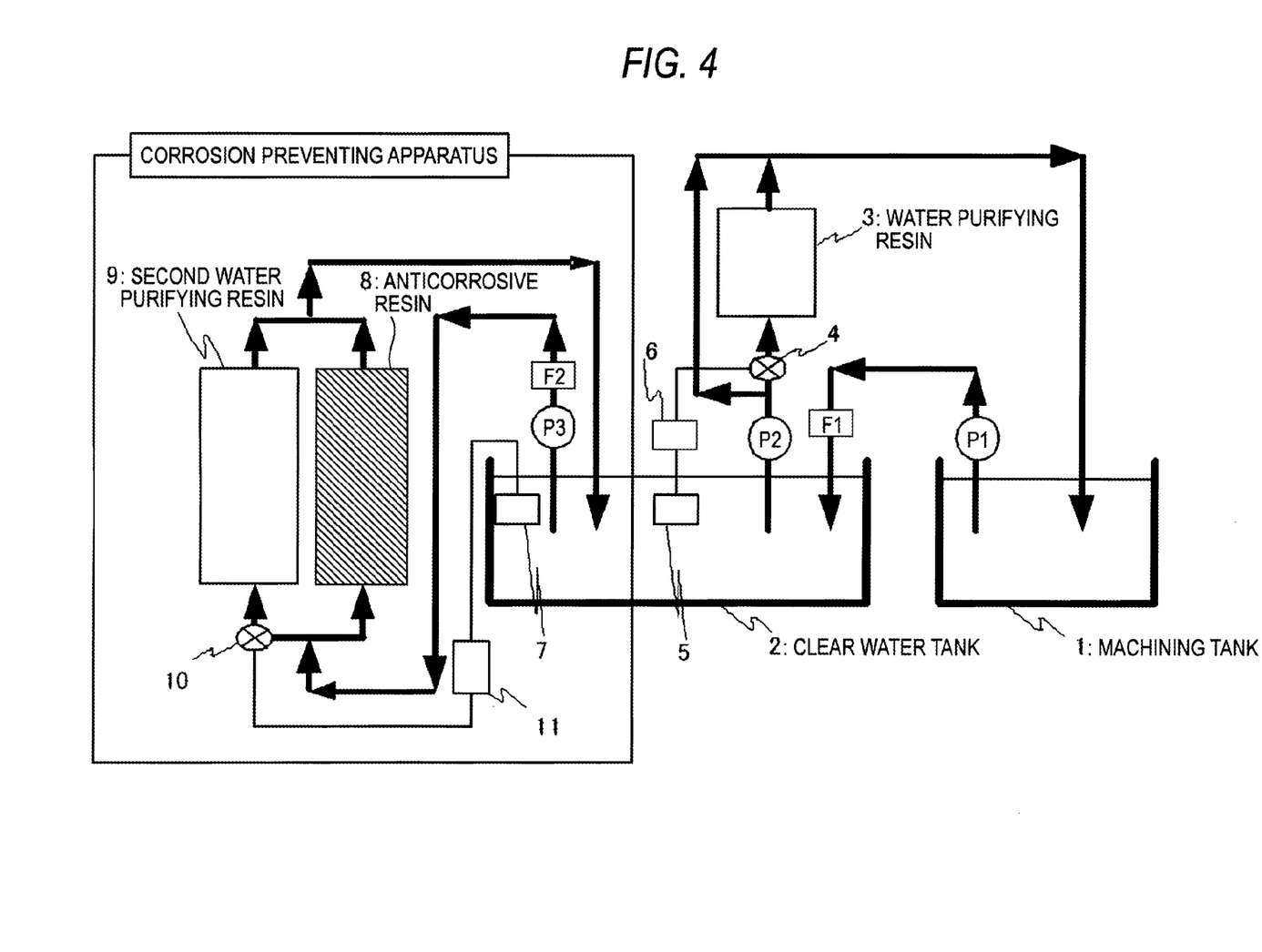
FIG. 4 is a view illustrating an example of application to a wire electric discharge machining apparatus.

FIG. 4 shows an example of application of the present invention to a wire electric discharge machining apparatus.

The main body of the wire electric discharge machining apparatus generally includes a machining tank 1 which is a machining unit in which a work piece and a wire electrode are separated from each other by a predetermined distance and a predetermined voltage is applied between them such that electric discharge occur, whereby machining is performed, and which machines an iron-based metal, a pump P1 that draws water from the machining tank 1, a filter F1 that removes solid materials from the water from the pump P1, a clear water tank 2 that accumulates the water having passed through the filter F1, a pump P2 that draws the water in the clear water tank 2, a first water purifying resin 3 that removes impurity ions from the water from the pump P2, an electromagnetic valve 4 that controls a flow of the water into the first water purifying resin 3, a conductivity meter 5 that measures the conductivity of the water in the clear water tank 2, and a first control unit 6 that controls opening and closing of the electromagnetic valve 4 on the basis of a measured value of the conductivity meter 5.

Further, a corrosion preventing apparatus according to the present invention includes a conductivity meter 7 that is a conductivity measuring part configured to measure the conductivity of the water in the clear water tank, an anticorrosive resin 8, a second water purifying resin 9 that is used together with the anticorrosive resin 8 and removes impurity ions from the water from the clear water tank, a pump P3 that makes the water flow into the clear water tank flow into the anticorrosive resin 8 and the second water purifying resin 9, a filter F2 that removes solid materials from the water from the clear water tank, an electromagnetic valve 10 that controls a flow of the water into the second water purifying resin 9, and a control unit 11 that controls opening and closing of the electromagnetic valve 10 on the basis of the measured value of the conductivity meter 7.

Since the conductivity meter 5 and the conductivity meter 7 measure the conductivity of the water in the same clear water tank, the two conductivity meters may be unified as one. In this case, although the first control unit 6 and the control unit 11 control different objects, they can be unified as one.

First Embodiment

Conditions for implementation of a first embodiment are as follow.

Figure 5:
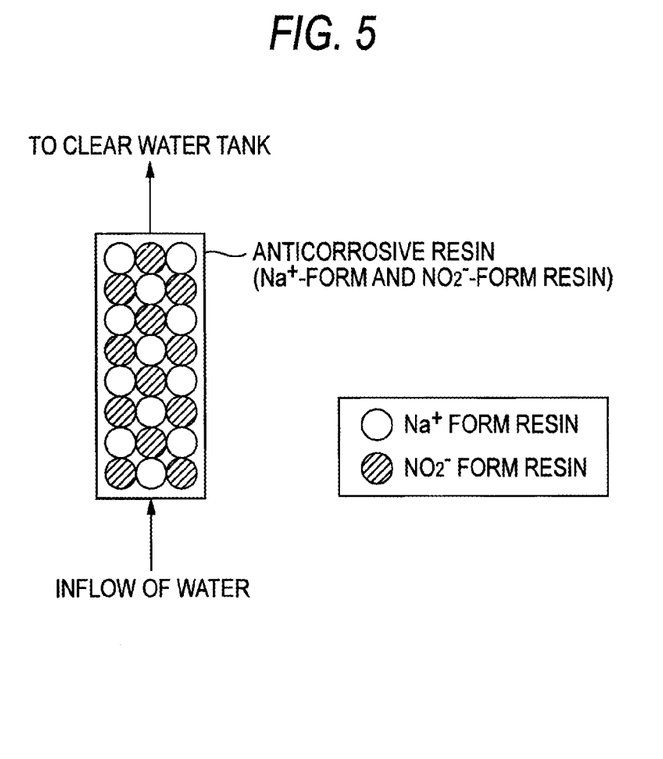
FIG. 5 is a conceptual view illustrating a flow of the water into the anticorrosive resin.

As the anticorrosive resin 8, a $Na^+$-form and $NO_2^-$-form resin is prepared by making a 3 mol/L $NaNO_2$ solution pass through a $Na^+$-form and $NO_2^-$-form resin which is a mixture 1.8 L of $Na^+$ form resin serving as the cation form resin and 2.2 L of the $NO_2^-$ form resin serving as the anion form resin (see FIG. 5). If the machining water in the clear water tank passes through the $Na^+$-form and $NO_2^-$-form resin, the machining water is converted into a $NaNO_2$ solution.

As each of the first water purifying resin 3 and the second water purifying resin 9 which are water purifying resins, a $H^+$-form and $OH^-$-form resin is prepared by mixing 5 L of $H^+$ form resin and 5 L of $OH^-$ form resin.

The control unit 11 sets the first reference conductivity, the second reference conductivity corresponding to the first reference conductivity, and the third reference conductivity corresponding to the second reference conductivity to 8 µS/cm or larger, 8 µS/cm, and 12 µS/cm, respectively, and performs opening and closing of the electromagnetic valve 10 on the basis of the measured value of the conductivity meter 7.

In the wire electric discharge machining apparatus, if the measured value of the conductivity meter 5 is 14 µS/cm or larger, the electromagnetic valve 4 is opened. Then, the water that has been made clean by removal of solid material in the filter F1 passes through the first water purifying resin 3, and returns to the machining tank 1. (Meanwhile, if the measured value is smaller than 14 µS/cm, the electromagnetic valve 4 is closed. Then, the clear water in the clear water tank returns to the machining tank 1, without passing through the first water purifying resin 3.)

Next, a detailed operation will be described.

First Step

In the present embodiment, it is assumed that the conductivity of the water in the clear water tank before the water is made flow into the corrosion preventing apparatus and the first water purifying resin 3 is 20 μS/cm.

In this case, the water in the clear water tank flows into the anticorrosive resin 8, and since the conductivity the water in the clear water tank measured by the conductivity meter 7 is more than the first reference conductivity, the control unit 11 opens the electromagnetic valve 10, and thus the water in the clear water tank also flows into the second water purifying resin 9.

Further, since the measured value of the conductivity meter 5 is also 20 μS/cm as described above, the water in the clear water tank also flows into the first water purifying resin 3 under the control of the first control unit 6.

When the water in the clear water tank passes through the first water purifying resin 3, the anticorrosive resin 8, the second water purifying resin 9, impurity ions in the water are substituted by $Na^+$, $H^+$, $NO_2^-$, and $OH^-$. Therefore, the conductivity of the water in the clear water tank is reduced.

If the conductivity of the water in the clear water tank becomes smaller than 14 μS/cm, the first control unit 6 closes the electromagnetic valve 4, such that the flow of the water into the first water purifying resin 3 stops.

Thereafter, if the conductivity of the water in the clear water tank reaches 8 μS/cm, the control unit 11 closes the electromagnetic valve 10 such that the flow of the water into the second water purifying resin 9 stops.

At this time, the concentration of $NO_2^-$ in the water in the clear water tank is 2.3 ppm.

Second Step

If the conductivity of the water in the clear water tank reaches 8 μS/cm, the water in the clear water tank does not flow into the water purifying resins, and flows into only the anticorrosive resin. Therefore, impurity ions in the water are substituted by $Na^+$ and $NO_2^-$ and thus the conductivity of the water in the clear water tank increases.

Third Step

If the conductivity of the water in the clear water tank reaches 12 μS/cm, the control unit 11 opens the electromagnetic valve 10 such that the water flows even into the second water purifying resin 9.

In this case, the water in the clear water tank passes through the anticorrosive resin 8 and the second water purifying resin 9 such that the impurity ions of the water are substituted by $Na^+$, $H^+$, $NO_2^-$, and $OH^-$, and thus the conductivity of the water in the clear water tank is reduced and reaches 8 μS/cm.

At this time, the concentration of $NO_2^-$ in the water in the clear water tank becomes 2.7 ppm.

As described above, according to the present embodiment, if the above-mentioned first to third steps are performed, the amount of $NO_2^-$ in the water in the clear water tank increases. Therefore, it is possible to improve the proportional relation between the conductivity and the concentration of $NO_2^-$.

In other words, although the concentration of $NO_2^-$ is 2.3 ppm when the conductivity of the water in the clear water tank reaches 8 μS/cm in the first step, if the conductivity of the water in the clear water tank is controlled by controlling the flow of the water into the water purifying resins while the flow of the water into the anticorrosive resin 8 is continued, such that impurity ions are substituted by $Na^+$ and $NO_2^-$, when the conductivity of the water in the clear water tank reaches 8 μS/cm in the third step, the concentration of $NO_2^-$ becomes 2.7 ppm, and the water in the clear water tank approaches a highly-pure anticorrosive single solution. Therefore, the conductivity and the concentration of anions have a proportional relation.

Therefore, it is possible to grasp the concentration of anticorrosive anions on the basis of the measured value of the conductivity, and maintain the lowest conductivity necessary for preventing corrosion of an iron-based metal.

According to the present embodiment, when carbon steel (S45C) was dipped in the machining tank for four days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $NO_2^-$ form resin.

According to a detailed example of the estimating method, it is possible to estimate the life of the $NO_2^-$ form resin at 14.4 days (=12 (days)×1.2), on the basis of the period (12 days) token the $Na^+$ form resin to come to the end, and the volume ratio 1.2 (=2.2 (L)/1.8 (L)) of the $NO_2^-$ form resin to the $Na^+$ form resin.

In the present embodiment, as the anticorrosive resin, the $Na^+$-form and $NO_2^-$-form resin is used. However, even in a case of using the $K^+$-form and $NO_2^-$-form resin or the $Ca^{2+}$-form and $NO_2^-$-form resin, the same effect can be obtained.

Figure 6:
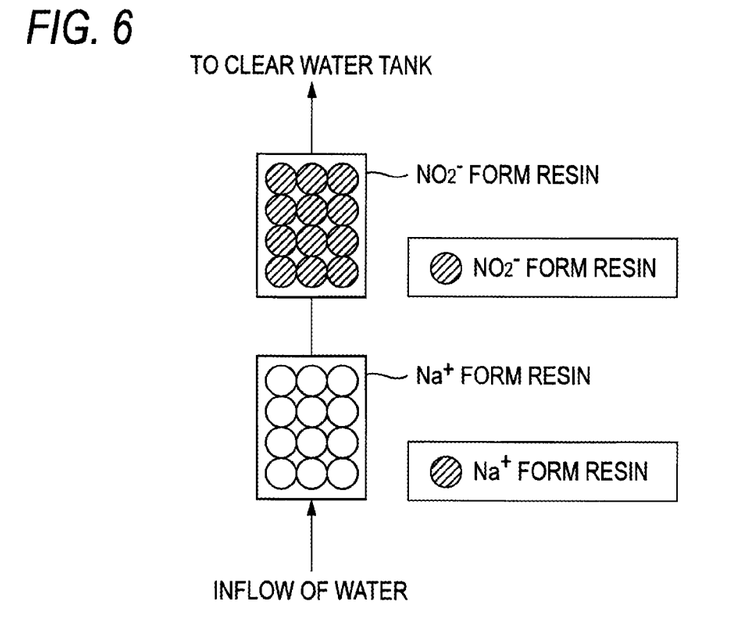
FIG. 6 is a view illustrating a configuration example of the anticorrosive resin.
Figure 7:
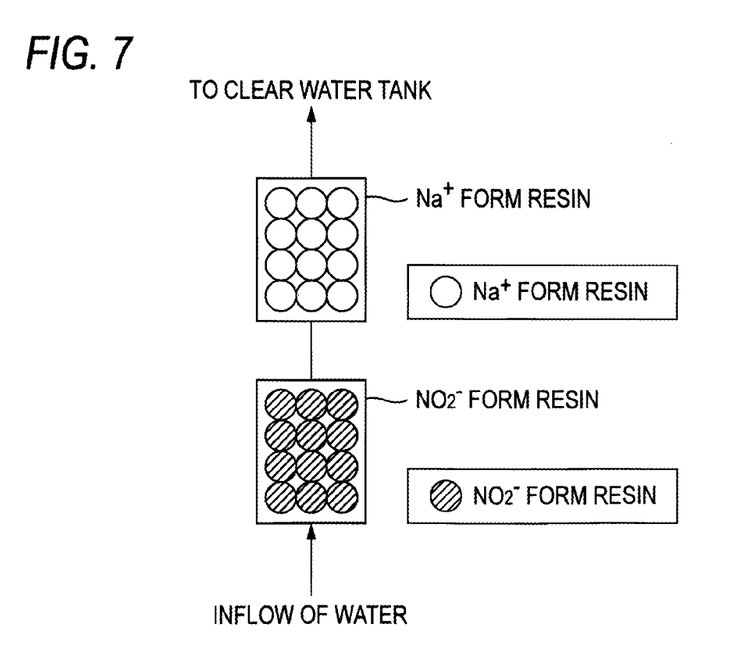
FIG. 7 is a view illustrating another configuration example of the anticorrosive resin.
Figure 8:
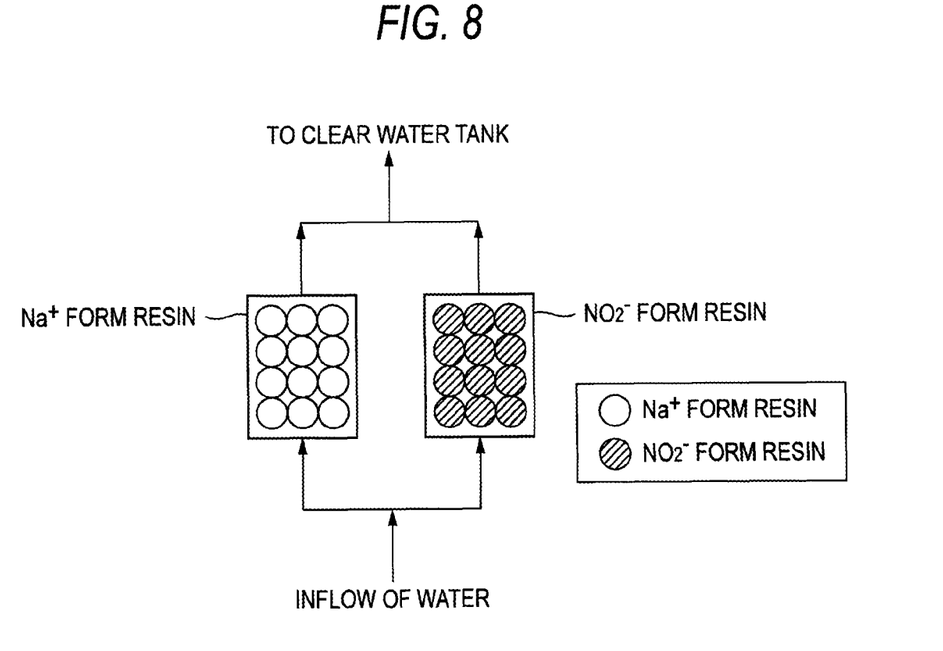
FIG. 8 is a view illustrating a further configuration example of the anticorrosive resin.

Further, in the present embodiment, the case where the anticorrosive resin 8 is a mixture of the cation form resin and the anion form resin as shown in FIG. 5 has been described. However, for example, as shown in FIGS. 6, 7, and 8, as the anticorrosive resin, a cation form resin and an anion form resin can be used independently from each other.

For example, a $H^+$ form resin and a $OH^+$ form resin are separately prepared at a predetermined volume ratio, and a 3 mol/L $NaNO_2$ solution is made pass through the $OH^-$ form resin and then is made pass through the $H^+$ form resin. Therefore, the $H^+$ form resin and the $OH^-$ form resin are converted into a $Na^+$ form resin and $NO_2^-$ form resin, respectively.

The advantages of making the $Na^+$ form resin and the $NO_2^-$ form resin independent from each other are that, when the $Na^+$ form resin comes to the end, it is possible to estimate the life of the $NO_2$ form resin, and if only the $Na^+$ form resin is exchanged with a new $Na^+$ form resin, it is possible to convert the machining water into a $NaNO_2$ solution until the $NO_2^-$ form resin comes to the end.

Furthermore, in the present embodiment, a 3 mol/L $NaNO_2$ solution is used to prepare a $Na^+$ form resin and a $NO_2^-$ form resin as the cation form resin and the anion form resin of the anticorrosive resin, respectively. However, in a case of preparing a $K^+$ form resin and a $NO_2^-$ form resin as the cation form resin and the anion form resin, respectively, it is preferable to use a $KNO_2$ solution, and in a case of preparing or a $Ca^{2+}$ form resin and a $NO_2^-$ form resin as the cation form resin and the anion form resin, respectively, it is preferable to use a $Ca(NO_2)_2$ solution.

Second Embodiment

Conditions for implementation of a second embodiment are as follow.

As the anticorrosive resin 8, a $Na^+$-form and $MoO_4^{2-}$-form resin is prepared by making a 3 mol/L $Na_2MoO_4$ solution pass through a $Na^+$-form and $MoO_4^{2-}$-form resin that is a mixture of 1.8 L of $Na^+$ form resin and 2.2 L of $MoO_4^{2-}$ form resin (see FIG. 5).

If the machining water in the clear water tank passes through the $Na^+$-form and $MoO_4^{2-}$-form resin, the machining water is converted into a $Na_2MoO_4$ solution.

As each of the first water purifying resin 3 and the second water purifying resin 9 which are water purifying resins, a H+-form and OH−-form resin is prepared by mixing 5 L of H+ form resin and 5 L of OH− form resin.

The control unit 11 sets the first reference conductivity, the second reference conductivity corresponding to the first reference conductivity, and the third reference conductivity corresponding to the second reference conductivity to 30 μS/cm or larger, 20 μS/cm, and 24 μS/cm, respectively, and performs opening and closing of the electromagnetic valve 10 on the basis of the measured value of the conductivity meter 7.

In the wire electric discharge machining apparatus, if the measured value of the conductivity meter 5 is 30 μS/cm or larger, the electromagnetic valve 4 is opened. Then, the water that has been made clean by removal of solid material in the filter F1 passes through the first water purifying resin 3, and returns to the machining tank 1. (Meanwhile, if the measured value is smaller than 30 μS/cm, the electromagnetic valve 4 is closed. Then, the clear water in the clear water tank returns to the machining tank 1, without passing through the first water purifying resin 3.)

Next, a detailed operation will be described.

First Step

In the present embodiment, it is assumed that the conductivity of the water in the clear water tank before the water is made flow into the corrosion preventing apparatus and the first water purifying resin 3 is 40 μS/cm.

In this case, the water in the clear water tank flows into the anticorrosive resin 8, and since the conductivity the water in the clear water tank measured by the conductivity meter 7 is more than the first reference conductivity, the control unit 11 opens the electromagnetic valve 10, and thus the water in the clear water tank also flows into the second water purifying resin 9.

Further, since the measured value of the conductivity meter 5 is also 40 μS/cm as described above, the water in the clear water tank also flows into the first water purifying resin 3 under the control of the first control unit 6.

When the water in the clear water tank passes through the first water purifying resin 3, the anticorrosive resin 8, the second water purifying resin 9, impurity ions in the water are substituted by $Na^+$, $H^+$, $MoO_4^{2-}$, and $OH^-$. Therefore, the conductivity of the water in the clear water tank is reduced.

If the conductivity of the water in the clear water tank becomes smaller than 30 S/cm, the first control unit 6 closes the electromagnetic valve 4, such that the flow of the water into the first water purifying resin 3 stops.

Thereafter, if the conductivity of the water in the clear water tank reaches 20 μS/cm, the control unit 11 closes the electromagnetic valve 10 such that the flow of the water into the second water purifying resin 9 stops.

At this time, the concentration of $MoO_4^{2-}$ in the water in the clear water tank is 8.1 ppm.

Second Step

If the conductivity of the water in the clear water tank reaches 20 μS/cm, the water in the clear water tank does not flow into the water purifying resins, and flows into only the anticorrosive resin. Therefore, impurity ions in the water are substituted by $Na^+$ and $MoO_4^{2-}$ and thus the conductivity of the water in the clear water tank increases.

Third Step

If the conductivity of the water in the clear water tank reaches 24 μS/cm, the control unit 11 opens the electromagnetic valve 10 such that the water flows even into the second water purifying resin 9.

In this case, the water in the clear water tank flows through the anticorrosive resin 8 and the second water purifying resin 9 such that the impurity ions of the water are substituted by $Na^+$, $H^+$, $MoO_4^{2-}$, and $OH^-$, and thus the conductivity of the water in the clear water tank is reduced and reaches 20 μS/cm.

At this time, the concentration of $MoO_4^{2-}$ in the water in the clear water tank becomes 9.6 ppm.

As described above, according to the present embodiment, if the above-mentioned first to third steps are performed, the amount of $MoO_4^{2-}$ in the water in the clear water tank increases. Therefore, it is possible to improve the proportional relation between the conductivity and the concentration of $MoO_4^{2-}$.

According to the present embodiment, when carbon steel (S45C) was dipped in the machining tank for two days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $MoO_4^{2-}$ form resin.

In the present embodiment, as the anticorrosive resin, the $Na^+$-form and $MoO_4^{2-}$-form resin is used. However, even in a case of using the $K^+$-form and $MoO_4^{2-}$-form resin or the $Ca^{2+}$-form and $MoO_4^{2-}$-form resin, the same effect can be obtained.

In the case of preparing a $MoO_4^{2-}$ form resin as the anion form resin, it is preferable to use a $Na_2MoO_4$ solution, a $K_2MoO_4$ solution, or a $CaMoO_4$ solution.

Third Embodiment

Conditions for implementation of a third embodiment are as follow.

As the anticorrosive resin 8, a $Na^+$-form and $WO_4^{2-}$-form resin is prepared by making a 3 mol/L $Na_2WO_4$ solution pass through a $Na^+$-form and $WO_4^{2-}$-form resin that is a mixture of 1.8 L of $Na^+$ form resin and 2.2 L of $WO_4^{2-}$ form resin (see FIG. 5).

If the machining water in the clear water tank passes through the $Na^+$-form and $WO_4^{2-}$-form resin, the machining water is converted into a $Na_2WO_4$ solution.

As each of the first water purifying resin 3 and the second water purifying resin 9 which are water purifying resins, a H+-form and OH−-form resin is prepared by mixing 5 L of H+ form resin and 5 L of OH− form resin.

The control unit 11 sets the first reference conductivity, the second reference conductivity corresponding to the first reference conductivity, and the third reference conductivity corresponding to the second reference conductivity to 40 μS/cm or larger, 24 μS/cm, and 28 μS/cm, respectively, and performs opening and closing of the electromagnetic valve 10 on the basis of the measured value of the conductivity meter 7.

In the wire electric discharge machining apparatus, if the measured value of the conductivity meter 5 is 40 μS/cm or larger, the electromagnetic valve 4 is opened. Then, the water that has been made clean by removal of solid material in the filter F1 passes through the first water purifying resin 3, and returns to the machining tank 1. (Meanwhile, if the measured value is smaller than 40 μS/cm, the electromagnetic valve 4 is closed. Then, the clear water in the clear water tank returns to the machining tank 1, without passing through the first water purifying resin 3.)

Next, a detailed operation will be described.

First Step

In the present embodiment, it is assumed that the conductivity of the water in the clear water tank before the water is made flow into the corrosion preventing apparatus and the first water purifying resin 3 is 50 µS/cm.

In this case, the water in the clear water tank flows into the anticorrosive resin 8, and since the conductivity the water in the clear water tank measured by the conductivity meter 7 is more than the first reference conductivity, the control unit 11 opens the electromagnetic valve 10, and thus the water in the clear water tank also flows into the second water purifying resin 9.

Further, since the measured value of the conductivity meter 5 is also 50 µS/cm as described above, the water in the clear water tank also flows into the first water purifying resin 3 under the control of the first control unit 6.

When the water in the clear water tank passes through the first water purifying resin 3, the anticorrosive resin 8, the second water purifying resin 9, impurity ions in the water are substituted by $Na^+$, $H^+$, $WO_4^{2-}$, and $OH^-$. Therefore, the conductivity of the water in the clear water tank is reduced.

If the conductivity of the water in the clear water tank becomes smaller than 40 µS/cm, the first control unit 6 closes the electromagnetic valve 4, such that the flow into the first water purifying resin 3 stops.

Thereafter, if the conductivity of the water in the clear water tank reaches 24 µS/cm, the control unit 11 closes the electromagnetic valve 10 such that the flow into the second water purifying resin 9 stops.

At this time, the concentration of $WO_4^{2-}$ in the water in the clear water tank is 12.4 ppm.

Second Step

If the conductivity of the water in the clear water tank reaches 24 µS/cm, the water in the clear water tank does not flow into the water purifying resins, and flows into only the anticorrosive resin. Therefore, impurity ions in the water are substituted by $Na^+$ and $WO_4^{2-}$ and thus the conductivity of the water in the clear water tank increases.

Third Step

If the conductivity of the water in the clear water tank reaches 28 µS/cm, the control unit 11 opens the electromagnetic valve 10 such that the water flows even into the second water purifying resin 9.

In this case, the water in the clear water tank passes through the anticorrosive resin 8 and the second water purifying resin 9 such that the impurity ions of the water are substituted by $Na^+$, $H^+$, $WO_4^{2-}$, and $OH^-$, and thus the conductivity of the water in the clear water tank is reduced and reaches 24 µS/cm.

At this time, the concentration of $WO_4^{2-}$ in the water in the clear water tank becomes 14.5 ppm.

As described above, according to the present embodiment, although the concentration of $WO_4^{2-}$ when the conductivity of the water in the clear water tank reaches 24 µS/cm in the first step is 12.4 ppm, when the conductivity of the water in the clear water tank reaches 24 µS/cm in the third step, the concentration of $WO_4^{2-}$ is 14.5 ppm.

If the above-mentioned first to third steps are performed, the amount of $WO_4^{2-}$ in the water in the clear water tank increases. Therefore, it is possible to improve the proportional relation between the conductivity of the water and the concentration of $WO_4^{2-}$.

According to the present embodiment, when carbon steel (S45C) was dipped in the machining tank for two days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $WO_4^{2-}$ form resin.

In the present embodiment, as the anticorrosive resin, the $Na^+$-form and $WO_4^{2-}$-form resin is used. However, even in a case of using the $K^+$-form and $WO_4^{2-}$-form resin or the $Ca^{2+}$-form and $WO_4^{2-}$-form resin, the same effect can be obtained.

In the case of preparing a $WO_4^{2-}$ form resin as the anion form resin, it is preferable to use a $Na_2WO_4$ solution, a $K_2WO_4$ solution, or a $CaWO_4$ solution.

Fourth Embodiment

Figure 9:
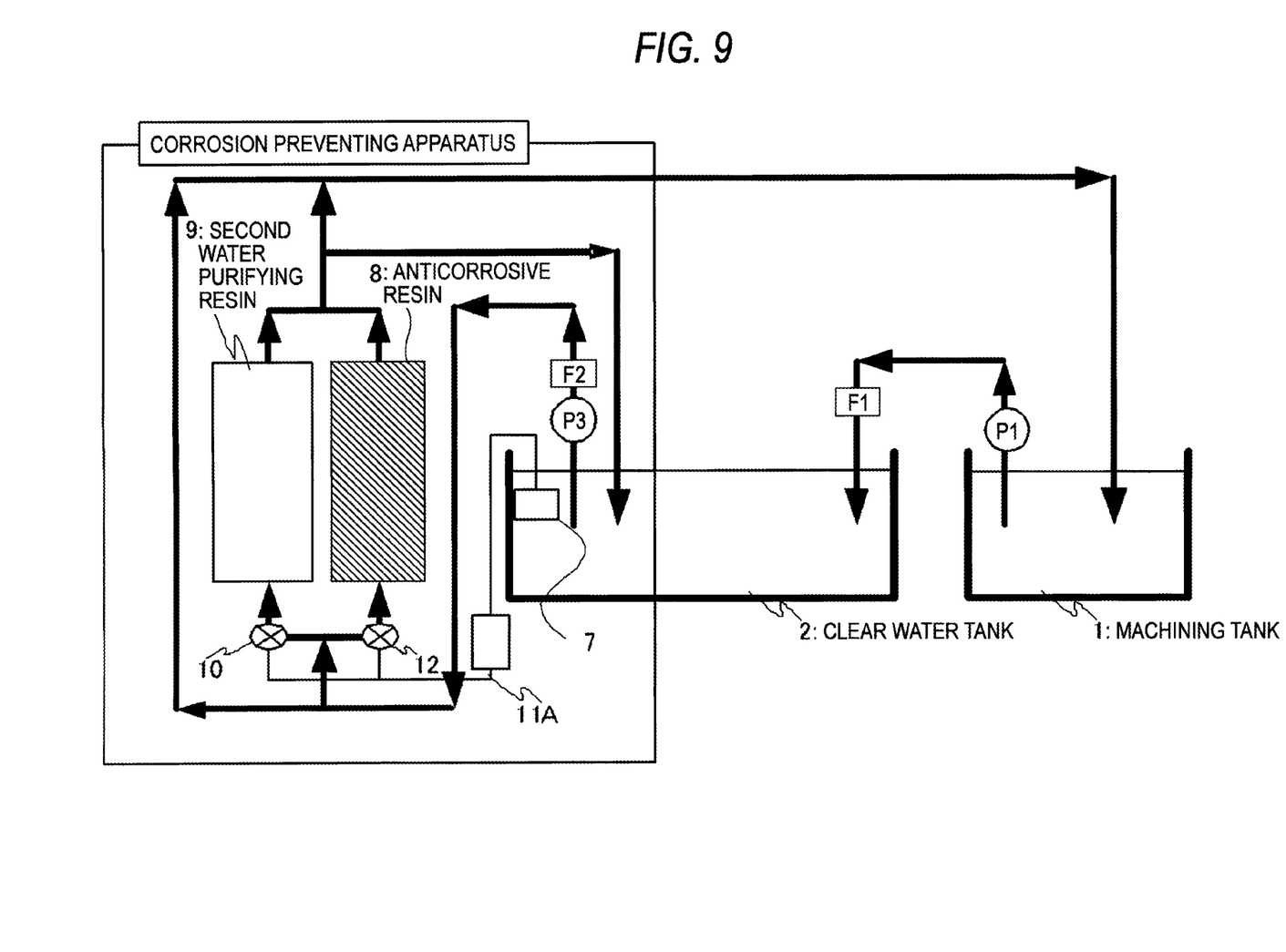
FIG. 9 is a view illustrating an example of application to a wire electric discharge machining apparatus.

FIG. 9 shows another configuration example applied to a wire electric discharge machining apparatus according to the present embodiment.

A big difference from the configuration of FIG. 4 is that a water purifying resin of a corrosion preventing apparatus serves as the first water purifying resin 3.

For this reason, even on the upstream side of the anticorrosive resin, an electromagnetic valve 12 is provided, and a control unit 11A controls the electromagnetic valve 10 and the electromagnetic valve 12 on the basis of the measured value of the conductivity meter 5.

In this embodiment, the third reference conductivity for the second step is set during electric discharge machining.

Conditions for implementation of the fourth embodiment are as follow.

As the anticorrosive resin 8, a $Na^+$-form and $NO_2^-$-form resin is prepared by making a 3 mol/L $NaNO_2$ solution pass through a $Na^+$-form and $NO_2^-$-form resin which is a mixture 1.8 L of $Na^+$ form resin serving as the cation form resin and 2.2 L of the $NO_2^-$ form resin serving as the anion form resin (see FIG. 5).

As the second water purifying resin 9 which is water purifying resins, a $H^+$-form and $OH^-$-form resin is prepared by mixing 5 L of $H^+$ form resin and 5 L of $OH^-$ form resin.

The control unit 11A sets the first reference conductivity, the second reference conductivity corresponding to the first reference conductivity, and the third reference conductivity corresponding to the second reference conductivity to 14 µS/cm or larger, 8 µS/cm, and 12 µS/cm, respectively, and performs opening and closing of each of the electromagnetic valves 10 and 12 on the basis of the measured value of the conductivity meter 7.

In the present embodiment, the water purifying resin also serves as the water purifying resin of the main body of the wire electric discharge machining apparatus.

Next, a detailed operation will be described.

First Step

In the present embodiment, it is assumed that the conductivity of the water in the clear water tank before the water is made flow into the corrosion preventing apparatus and the first water purifying resin 3 is 20 µS/cm.

In this case, the water in the clear water tank flows into the anticorrosive resin 8, and since the conductivity the water in the clear water tank measured by the conductivity meter 7 is more than the first reference conductivity, the control unit 11A opens the electromagnetic valves 10 and 12, and thus the water in the clear water tank also flows into the anticorrosive resin 8 and the second water purifying resin 9.

When the water in the clear water tank passes through the anticorrosive resin 8, and the second water purifying resin, impurity ions in the water are substituted by $Na^+$, $H^+$, $NO_2^-$, and $OH^-$. Therefore, the conductivity of the water in the clear water tank is reduced.

Thereafter, if the conductivity of the water in the clear water tank reaches 8 µS/cm, the control unit 11A closes the electromagnetic valve 10 such that the flow of the water into the second water purifying resin 9 stops.

At this time, the concentration of $NO_2^-$ in the water in the clear water tank is 2.3 ppm.

Second Step

If the conductivity of the water in the clear water tank reaches 8 μS/cm, the water in the clear water tank does not flow into the water purifying resin, and flows into only the anticorrosive resin. Therefore, impurity ions in the water are substituted by $Na^+$ and $NO_2^-$ and thus the conductivity of the water in the clear water tank increases.

Third Step

If the conductivity of the water in the clear water tank reaches 12 μS/cm, the control unit 11A opens the electromagnetic valve 10 such that the water flows even into the second water purifying resin 9.

In this case, the water in the clear water tank passes through the anticorrosive resin 8 and the second water purifying resin 9 such that the impurity ions of the water are substituted by $Na^+$, $H^+$, $NO_2^-$, and $OH^-$, and thus the conductivity of the water in the clear water tank is reduced and reaches 8 μS/cm.

At this time, the concentration of $NO_2^-$ in the water in the clear water tank becomes 2.7 ppm.

As described above, according to the present embodiment, if the above-mentioned first to third steps are performed, the amount of $NO_2^-$ in the water in the clear water tank increases. Therefore, it is possible to improve the proportional relation between the conductivity and the concentration of $NO_2^-$.

In other words, although the concentration of $NO_2^-$ is 2.3 ppm when the conductivity of the water in the clear water tank reaches 8 μS/cm in the first step, if the conductivity of the water in the clear water tank is controlled by controlling the flow of the water into the water purifying resins while the flow of the water into the anticorrosive resin 8 is continued, such that impurity ions are substituted by $Na^+$ and $NO_2^-$, when the conductivity of the water in the clear water tank reaches 8 μS/cm in the third step, the concentration of $NO_2^-$ becomes 2.7 ppm, and the water in the clear water tank approaches a highly-pure anticorrosive single solution. Therefore, the conductivity and the concentration of anions have a proportional relation.

Therefore, it is possible to grasp the concentration of anticorrosive anions on the basis of the measured value of the conductivity, and maintain the lowest conductivity necessary for preventing corrosion of an iron-based metal.

According to the present embodiment, when carbon steel (S45C) was dipped in the machining tank for four days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $NO_2^-$ form resin.

According to a detailed example of the estimating method, it is possible to estimate the life of the $NO_2^-$ form resin at 14.4 days (=12 (days)×1.2), on the basis of the period (12 days) token the $Na^+$ form resin to come to the end, and the volume ratio 1.2 (=2.2 (L)/1.8 (L)) of the $NO_2^-$ form resin to the $Na^+$ form resin.

In the present embodiment, as the anticorrosive resin, the $Na^+$-form and $NO_2^-$-form resin is used. However, even in a case of using the $K^+$-form and $NO_2^-$-form resin or the $Ca^{2+}$-form and $NO_2^-$-form resin, the same effect can be obtained.

Fifth Embodiment

Conditions for implementation of a fifth embodiment are as follow.

As the anticorrosive resin 8, a $Na^+$-form and $MoO_4^{2-}$-form resin is prepared by making a 3 mol/L $Na_2MoO_4$ solution pass through a $Na^+$-form and $MoO_4^{2-}$-form resin that is a mixture of 1.8 L of $Na^+$ form resin and 2.2 L of $MoO_4^{2-}$ form resin (see FIG. 5).

As the second water purifying resin 9 which is water purifying resins, a $H^+$-form and $OH^-$-form resin is prepared by mixing 5 L of $H^+$ form resin and 5 L of $OH^-$ form resin.

The control unit 11A sets the first reference conductivity, the second reference conductivity corresponding to the first reference conductivity, and the third reference conductivity corresponding to the second reference conductivity to 30 μS/cm or larger, 20 μS/cm, and 24 μS/cm, respectively, and performs opening and closing of the electromagnetic valve 10 on the basis of the measured value of the conductivity meter 7.

Even in the present embodiment, similarly to the fourth embodiment, the water purifying resin also serves as the water purifying resin of the main body of the wire electric discharge machining apparatus.

Next, a detailed operation will be described.

First Step

In the present embodiment, it is assumed that the conductivity of the water in the clear water tank before the water is made flow into the corrosion preventing apparatus and the first water purifying resin 3 is 40 μS/cm.

In this case, the water in the clear water tank flows into the anticorrosive resin 8, and since the conductivity the water in the clear water tank measured by the conductivity meter 7 is more than the first reference conductivity, the control unit 11A opens the electromagnetic valves 10 and 12, and thus the water in the clear water tank also flows into the anticorrosive resin 8 and the second water purifying resin 9.

When the water in the clear water tank passes through the anticorrosive resin 8, and the second water purifying resin, impurity ions in the water are substituted by $Na^+$, $H^+$, $MoO_4^{2-}$, and $OH^-$. Therefore, the conductivity of the water in the clear water tank is reduced.

Thereafter, if the conductivity of the water in the clear water tank reaches 20 μS/cm, the control unit 11A closes the electromagnetic valve 10 such that the flow into the second water purifying resin 9 stops.

At this time, the concentration of $MoO_4^{2-}$ in the water in the clear water tank is 8.1 ppm.

Second Step

If the conductivity of the water in the clear water tank reaches 20 μS/cm, the water in the clear water tank does not flow into the water purifying resin, and flows into only the anticorrosive resin. Therefore, impurity ions in the water are substituted by $Na^+$ and $MoO_4^{2-}$ and thus the conductivity of the water in the clear water tank increases.

Third Step

If the conductivity of the water in the clear water tank reaches 24 μS/cm, the control unit 11A opens the electromagnetic valve 10 such that the water flows even into the second water purifying resin 9.

In this case, the water in the clear water tank passes through the anticorrosive resin 8 and the second water purifying resin 9 such that the impurity ions of the water are substituted by $Na^+$, $H^+$, $MoO_4^{2-}$, and $OH^-$, and thus the conductivity of the water in the clear water tank is reduced and reaches 20 μS/cm.

At this time, the concentration of $NO_2^-$ in the water in the clear water tank becomes 9.6 ppm.

As described above, according to the present embodiment, although the concentration of $MoO_4^{2-}$ when the conductivity of the water in the clear water tank reaches 20 μS/cm in the first step is 8.1 ppm, when the conductivity of the water in the clear water tank reaches 20 μS/cm in the third step, the concentration of $MoO_4^{2-}$ is 9.6 ppm.

In other words, according to the present embodiment if the above-mentioned first to third steps are performed, the amount of $MoO_4^{2-}$ in the water in the clear water tank increases. Therefore, it is possible to improve the proportional relation between the conductivity and the concentration of $MoO_4^{2-}$.

According to the present embodiment, when carbon steel (S45C) was dipped in the machining tank for two days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $MoO_4^{2-}$ form resin.

In the present embodiment, as the anticorrosive resin, the $Na^+$-form and $MoO_4^{2-}$-form resin is used. However, even in a case of using the $K^+$-form and $MoO_4^{2-}$-form resin or the $Ca^{2+}$-form and $MoO_4^{2-}$-form resin, the same effect can be obtained.

Sixth Embodiment

Conditions for implementation of a sixth embodiment are as follow.

As the anticorrosive resin 8, a $Na^+$-form and $WO_4^{2-}$-form resin is prepared by making a 3 mol/L $Na_2WO_4$ solution pass through a $Na^+$-form and $WO_4^{2-}$-form resin that is a mixture of 1.8 L of $Na^+$ form resin and 2.2 L of $WO_4^{2-}$ form resin (see FIG. 5).

As the second water purifying resin 9 which is water purifying resins, a $H^+$-form and $OH^-$-form resin is prepared by mixing 5 L of $H^+$ form resin and 5 L of $OH^-$ form resin.

The control unit 11A sets the first reference conductivity, the second reference conductivity corresponding to the first reference conductivity, and the third reference conductivity corresponding to the second reference conductivity to 40 μS/cm or larger, 24 μS/cm, and 28 μS/cm, respectively, and performs opening and closing of the electromagnetic valve 10 on the basis of the measured value of the conductivity meter 7.

In the present embodiment, the water purifying resin also serves as the water purifying resin of the main body of the wire electric discharge machining apparatus.

Next, a detailed operation will be described.

In the present embodiment, it is assumed that the conductivity of the water in the clear water tank before the water is made flow into the corrosion preventing apparatus and the first water purifying resin 3 is 50 μS/cm.

In this case, the water in the clear water tank flows into the anticorrosive resin 8, and since the conductivity the water in the clear water tank measured by the conductivity meter 7 is more than the first reference conductivity, the control unit 11A opens the electromagnetic valves 10 and 12, and thus the water in the clear water tank also flows into the anticorrosive resin 8 and the second water purifying resin 9.

When the water in the clear water tank passes through the anticorrosive resin 8, and the second water purifying resin, impurity ions in the water are substituted by $Na^+$, $H^+$, $WO_4^{2--}$, and $OH^-$. Therefore, the conductivity of the water in the clear water tank is reduced.

Thereafter, if the conductivity of the water in the clear water tank reaches 24 μS/cm, the control unit 11A closes the electromagnetic valve 10 such that the flow into the second water purifying resin 9 stops.

At this time, the concentration of $WO_4^{2-}$ in the water in the clear water tank is 12.4 ppm.

Second Step

If the conductivity of the water in the clear water tank reaches 24 μS/cm, the water in the clear water tank does not flow into the water purifying resin, and flows into only the anticorrosive resin. Therefore, impurity ions in the water are substituted by $Na^+$ and $WO_4^{2-}$ and thus the conductivity of the water in the clear water tank increases.

Third Step

If the conductivity of the water in the clear water tank reaches 28 μS/cm, the control unit 11A opens the electromagnetic valve 10 such that the water flows even into the second water purifying resin 9.

In this case, the water in the clear water tank passes through the anticorrosive resin 8 and the second water purifying resin 9 such that the impurity ions of the water are substituted by $Na^+$, $H^+$, $WO_4^{2-}$, and $OH^-$, and thus the conductivity of the water in the clear water tank is reduced and reaches 20 μS/cm.

At this time, the concentration of $WO_4^{2-}$ in the water in the clear water tank becomes 14.5 ppm.

As described above, according to the present embodiment, although the concentration of $WO_4^{2-}$ when the conductivity of the water in the clear water tank reaches 24 μS/cm in the first step is 12.4 ppm, when the conductivity of the water in the clear water tank reaches 24 μS/cm in the third step, the concentration of $WO_4^{2-}$ is 14.5 ppm.

If the above-mentioned first to third steps are performed, the amount of $WO_4^{2-}$ in the water in the clear water tank increases. Therefore, it is possible to improve the proportional relation between the conductivity of the water and the concentration of $WO_4^{2-}$.

According to the present embodiment, when carbon steel (S45C) was dipped in the machining tank for two days while repeating the first to third steps, the glass of the carbon steel had been maintained and rust had not occurred.

Further, when a $Na^+$ meter was dipped in the clear water tank and measured the concentration of $Na^+$ in the clear water tank in the second step, the concentration of $Na^+$ increased little after 12 days. This implies that the $Na^+$ form resin of the anticorrosive resin came to the end. Therefore, it is possible to estimate the life of the $WO_4^{2-}$ form resin.

In the present embodiment, as the anticorrosive resin, the $Na^+$-form and $WO_4^{2-}$-form resin is used. However, even in a case of using the $K^+$-form and $WO_4^{2-}$-form resin or the $Ca^{2+}$-form and $WO_4^{2-}$-form resin, the same effect can be obtained.

In the case of preparing a $WO_4^{2-}$ form resin as the anion form resin, it is preferable to use a $Na_2WO_4$ solution, a $K_2WO_4$ solution, or a $CaWO_4$ solution.

INDUSTRIAL APPLICABILITY

The present invention is suitable to be applied to a wire electric discharge machining apparatus.

DESCRIPTION OF REFERENCE NUMERAL 1 machining tank
2 clear water tank
3 first water purifying resin
4 electromagnetic valve
5 conductivity meter
6 first control unit 7 conductivity meter
8 anticorrosive resin
9 second water purifying resin
10 electromagnetic valve
11, 11A control unit
12 electromagnetic valve

The invention claimed is:

1. A corrosion preventing apparatus comprising:
a water purifying part that includes a hydrogen-ion form resin and a hydroxy-ion form resin;
an anticorrosive part that includes a cation form resin and an anion form resin having anticorrosive ions supported thereon; wherein the anticorrosive ions of the anion form resin is one of nitrite ions, molybdate ions, and tungstate ions;
a conductivity measuring part that measures a measured value of conductivity of a machining liquid; and
a control part that controls a flow of the machining liquid to the water purifying part and the anticorrosive part on the basis of the conductivity measuring part;
wherein, on the basis of predetermined first and second conductivities and the measured value measured by the conductivity measuring part, the control part performs control such that the machining liquid flows into the water purifying part and the anticorrosive part until the measured value of the machining liquid reaches the first conductivity,
when the measured value reaches the first conductivity, the control part performs control such that the flow of the machining liquid into the water purifying part stops and the machining liquid flows into only the anticorrosive part, and
when the measured value increases up to the second conductivity, the control part performs control such that the flow of the machining liquid into the water purifying part restarts and the machining liquid flows into the water purifying part and the anticorrosive part.

2. The corrosion preventing apparatus according to claim 1, wherein:
the predetermined first conductivity is set to the lowest conductivity for obtaining a corrosion preventing function on an iron-based metal, and the second conductivity is set to the highest conductivity for obtaining the corrosion preventing function on an iron-based metal.

3. The corrosion preventing apparatus according to claim 1, wherein:
as cations of the cation form resin of the anticorrosive part, one of sodium ions, potassium ions and calcium ions is selected.

4. The corrosion preventing apparatus according to claim 1, wherein:
a volume ratio of the cation form resin to the entire resin of the anticorrosive part is set to 0.05 or larger and smaller than 0.5.

5. The corrosion preventing apparatus according to claim 3, wherein:
in a case of using the nitrite ions as the anticorrosive ions of the anion form resin, the first conductivity is set to 4 µS/cm or larger, and the second conductivity is set to 5 µS/cm or larger.

6. The corrosion preventing apparatus according to claim 3, wherein:
in a case of using the molybdate ions as the anticorrosive ions of the anion form resin, the first conductivity is set to 15 µS/cm or larger, and the second conductivity is set to 16 µS/cm or larger.

7. The corrosion preventing apparatus according to claim 3, wherein:
in a case of using the tungstate ions as the anticorrosive ions of the anion form resin, the first conductivity is set to 20 µS/cm or larger, and the second conductivity is set to 21 µS/cm or larger.

8. A corrosion preventing method using a corrosion preventing apparatus which includes a water purifying part that includes a hydrogen-ion form resin and a hydroxy-ion form resin, an anticorrosive part that includes a cation form resin and an anion form resin having anticorrosive ions supported thereon; a conductivity measuring part that measures a measured value of conductivity of a machining liquid, and a control part that controls a flow of the machining liquid to the water purifying part and the anticorrosive part on the basis of the conductivity measuring part, the method comprising the steps of,
the control part controlling such that the machining liquid flows into the water purifying part and the anticorrosive part until the measured value of the machining liquid reaches a first predetermined conductivity, wherein said controlling is performed on the basis of the predetermined first conductivity and a second conductivity and the measured value measured by the conductivity measuring part,
the control part controlling such that the flow of the machining liquid into the water purifying part stops and the machining liquid flows into only the anticorrosive part if the measured value reaches the first conductivity; and
the control part controlling such that the flow of the machining liquid into the water purifying part restarts and the machining liquid flows into the water purifying part and the anticorrosive part if the measured value increases up to the second conductivity, wherein
as the anticorrosive ions of the anion form resin of the anticorrosive part, one of nitrite ions, molybdate ions, and tungstate ions is selected.

9. The corrosion preventing method according to claim 8, wherein:
the first predetermined conductivity is the lowest conductivity for obtaining a corrosion preventing function on an iron-based metal, and the second conductivity is the highest conductivity for obtaining the corrosion preventing function on an iron-based metal.

10. The corrosion preventing method according to claim 8, wherein:
as cations of the cation form resin of the anticorrosive part, one of sodium ions, potassium ions, and calcium ions is selected.

11. The corrosion preventing method according to claim 8, wherein:
a volume ratio of the cation form resin to the entire resin of the anticorrosive part is set to 0.05 or larger and smaller than 0.5.

12. The corrosion preventing method according to claim 10, wherein:
nitrite ions are the anticorrosive ions of the anion form resin, the first conductivity is set to 4 µS/cm or larger, and the second conductivity is set to 5 µS/cm or larger.

13. The corrosion preventing method according to claim 10, wherein:
molybdate ions are the anticorrosive ions of the anion form resin, the first conductivity is set to 15 µS/cm or larger, and the second conductivity is set to 16 µS/cm or larger.

14. The corrosion preventing method according to claim 10, wherein:

tungstate ions are the anticorrosive ions of the anion form resin, the first conductivity is set to 20 µS/cm or larger, and the second conductivity is set to 21 µS/cm or larger.

15. A wire electric discharge machining apparatus in which a work piece and a wire electrode are separated from each other by a predetermined distance, and machining is performed by applying a voltage therebetween such that electric discharge is generated, the electric discharge machining apparatus comprising:
   a corrosion preventing mechanism comprising:
   a water purifying part that includes a hydrogen-ion form resin and a hydroxy-ion form resin,
   an anticorrosive part that includes a cation form resin and an anion form resin having anticorrosive ions supported thereon,
   a conductivity measuring part that measures a measured value of conductivity of a machining liquid, and
   a control part that controls a flow of the machining liquid to the water purifying part and the anticorrosive part on the basis of the conductivity measuring part,
   wherein, in the corrosion preventing mechanism, on the basis of predetermined first and second conductivities and the measured value measured by the conductivity measuring part, the control part performs control such that the machining liquid flows into the water purifying part and the anticorrosive part until the measured value of the machining liquid reaches the first conductivity,
   if the measured value reaches the first conductivity, the control part performs control such that the flow of the machining liquid into the water purifying part stops and the machining liquid flows into only the anticorrosive part, and
   if the measured value increases up to the second conductivity, the control part performs control such that the flow of the machining liquid into the water purifying part restarts and the machining liquid flows into the water purifying part and the anticorrosive part, wherein as the anticorrosive ions of the anion form resin of the anticorrosive part, one of nitrite ions, molybdate ions and tungstate ions is selected.

16. The wire electric discharge machining apparatus according to claim 15, wherein:
   the predetermined first conductivity is set to the lowest conductivity for obtaining a corrosion preventing function on an iron-based metal, and the second conductivity is set to the highest conductivity for obtaining the corrosion preventing function on an iron-based metal.

17. The wire electric discharge machining apparatus according to claim 15, wherein:
   as cations of the cation form resin of the anticorrosive part, one of sodium ions, potassium ions and calcium ions is selected.

18. The corrosion preventing apparatus according to claim 15, wherein:
   a volume ratio of the cation form resin to the entire resin of the anticorrosive part is set to 0.05 or larger and smaller than 0.5.

19. The wire electric discharge machining apparatus according to claim 17, wherein:
   in a case of using the nitrite ions as the anticorrosive ions of the anion form resin, the first conductivity is set to 4 µS/cm or larger, and the second conductivity is set to 5 µS/cm or larger.

20. The wire electric discharge machining apparatus according to claim 17, wherein:
   in a case of using the molybdate ions as the anticorrosive ions of the anion form resin, the first conductivity is set to 15 µS/cm or larger, and the second conductivity is set to 16 µS/cm or larger.

21. The wire electric discharge machining apparatus according to claim 17, wherein:
   in a case of using the tungstate ions as the anticorrosive ions of the anion form resin, the first conductivity is set to 20 µS/cm or larger, and the second conductivity is set to 21 µS/cm or larger.

* * * * *